UNITED STATES PATENT OFFICE.

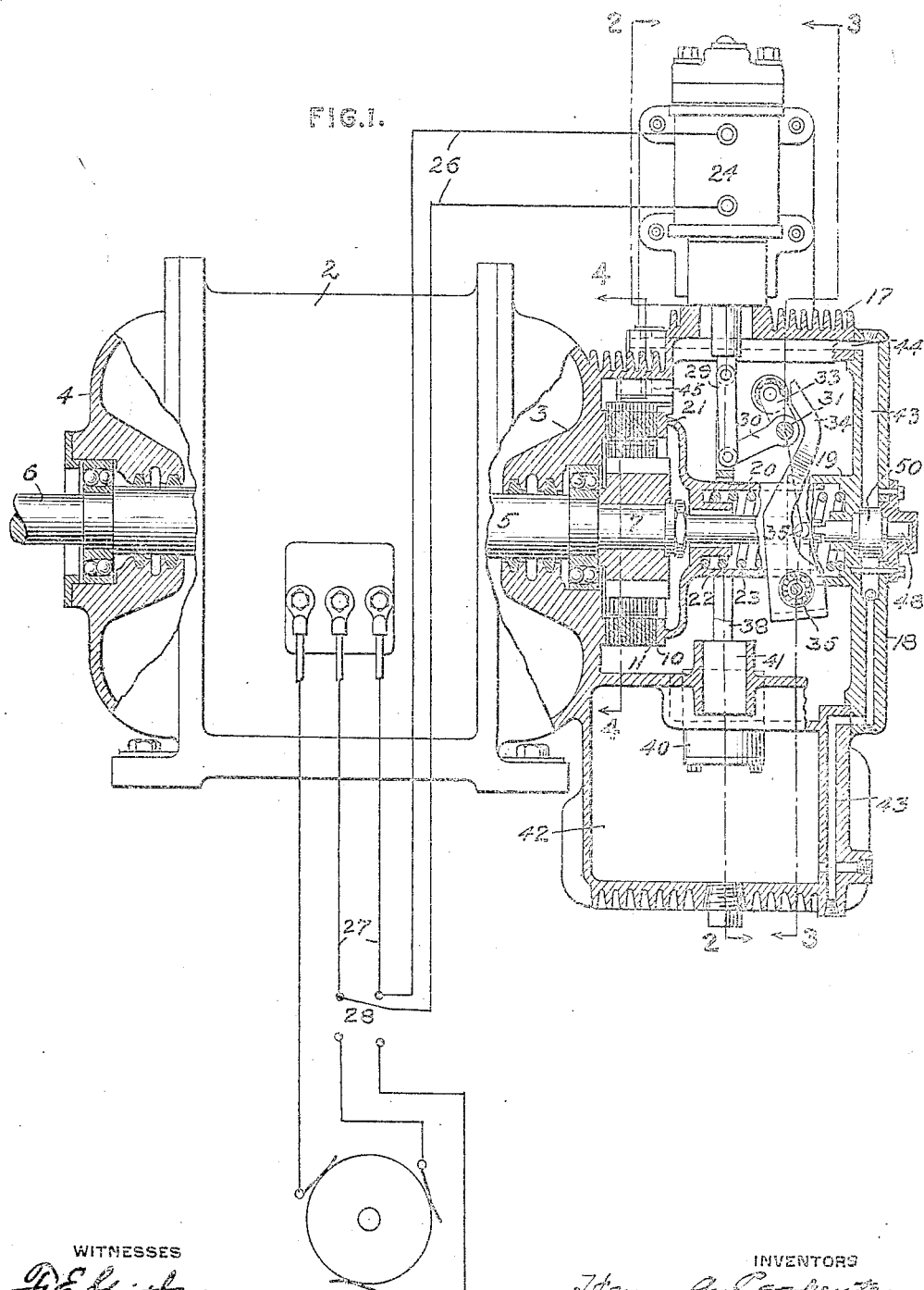

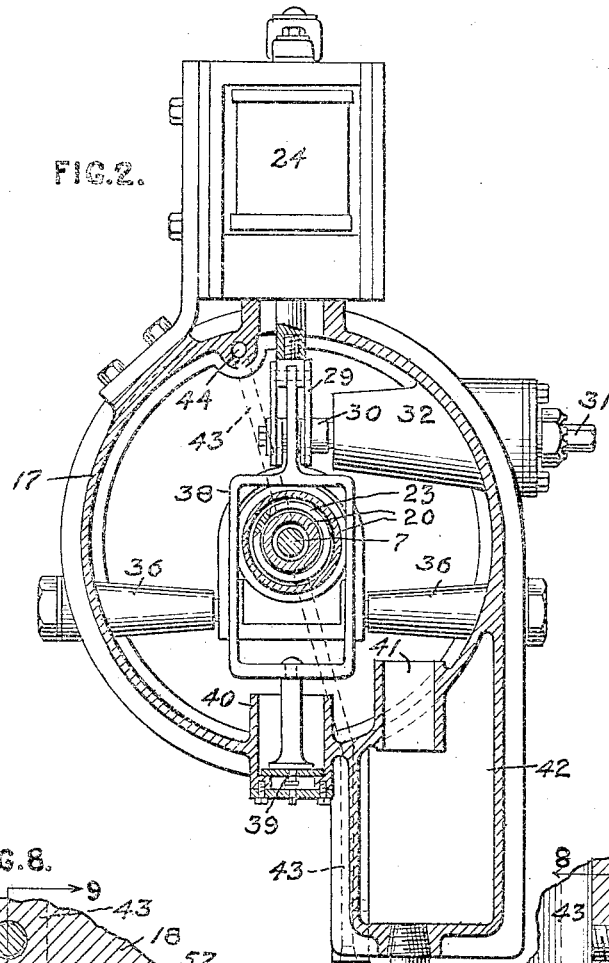
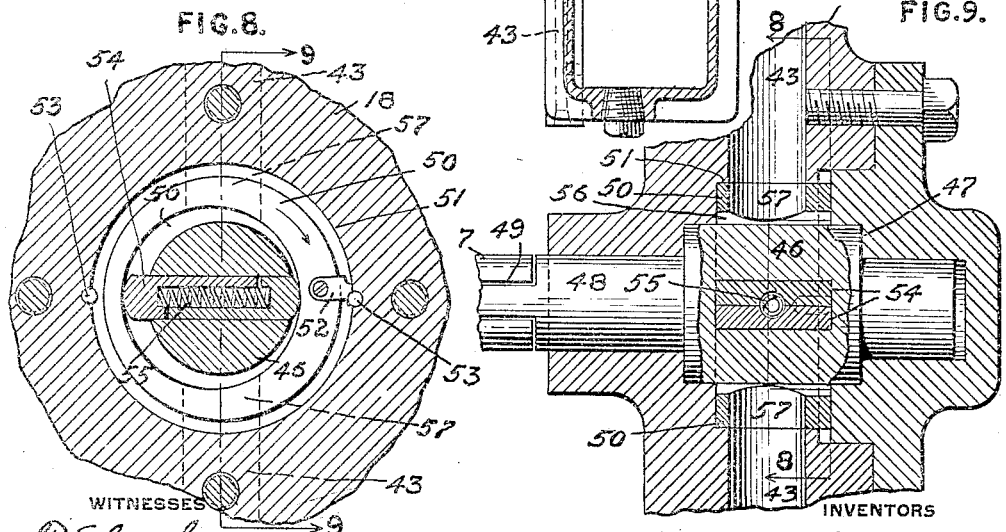

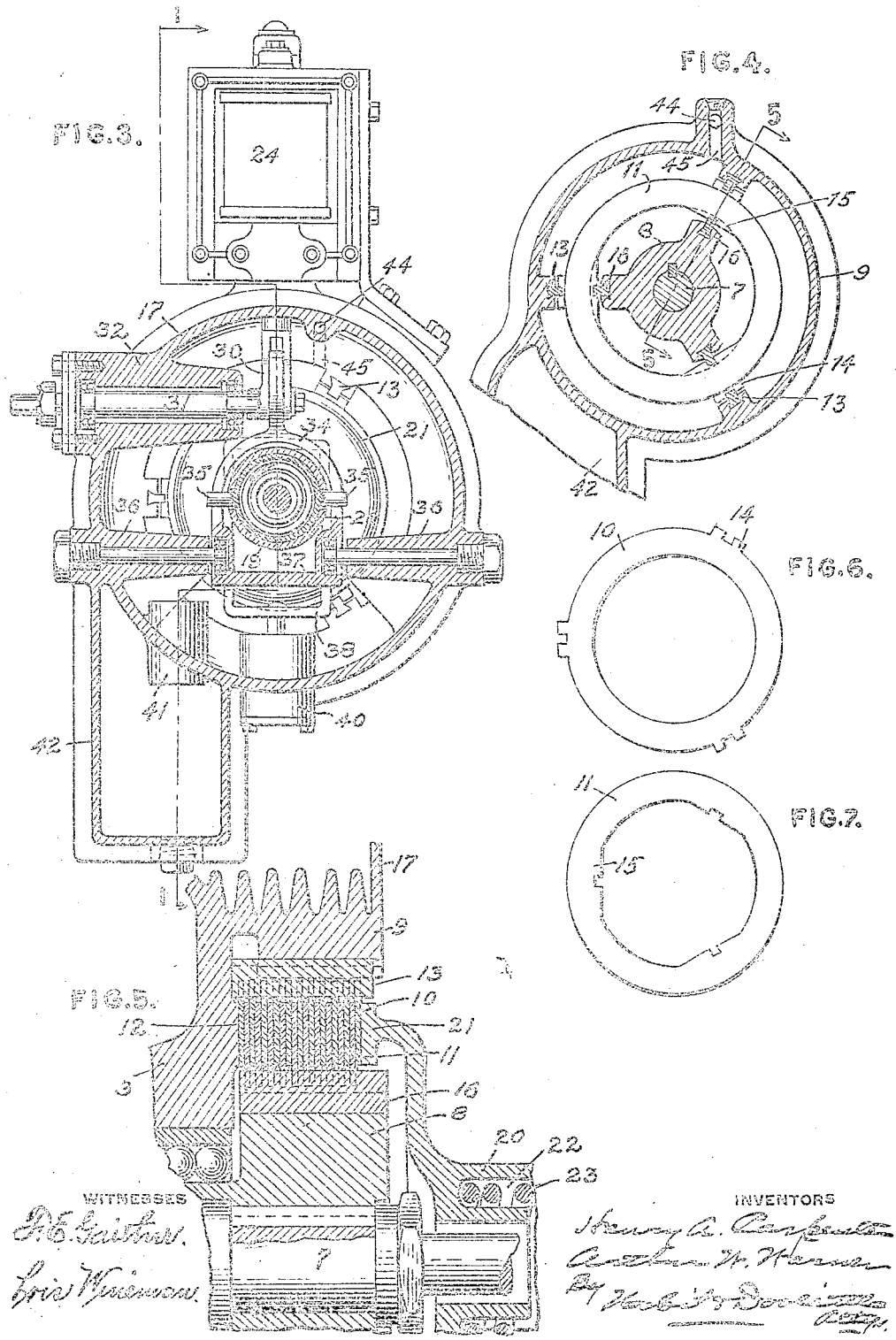

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

BRAKE MECHANISM.

1,174,678.          Specification of Letters Patent.          Patented Mar. 7, 1916.

Application filed October 30, 1914.  Serial No. 869,426.

*To all whom it may concern:*

Be it known that we, HENRY A. CARPENTER and ARTHUR W. WARNER, citizens of the United States, and residents of Sewickley, in the county of Allegheny and State of Pennsylvania, have invented certain new and useful Improvements in Brake Mechanism, of which the following is a specification.

This invention relates to a brake of friction-disk type wherein high braking power is developed from relatively low pressure per square inch of engaging surface.

One object is to provide for such permanent uniformity in the operation following the initial adjustment that readjustments are wholly avoided. This is accomplished by maintaining the parts thoroughly lubricated and practically eliminating all wear. In addition to preserving the operating parts, a uniform coast to rest is had each time the brake is applied. Such uniformity is highly desirable in many types of machines, and particularly where the starting and stopping of apparatus subject to braking controls the starting and stopping of mechanisms operating in consonance therewith.

The invention is designed primarily for braking and for producing a uniform coast to rest of an electric motor after it has been deënergized, and such an adaptation is here shown, the mechanism being inclosed in a dust-tight casing and with means for maintaining a constant circulation of oil around and between the brake disks. A uniformly acting brake-setting spring force is made operative simultaneously with deënergizing the motor, and upon energizing the motor this force is overcome and the brake released by a long-stroke solenoid from which the necessary power is transmitted through levers suitable for the purpose.

In the accompanying drawings, Figure 1 is a vertical section of the improved mechanism on the irregular line 1—1 of Fig. 3, the same being illustrated in connection with an electric motor, the electrical connections for the motor and for the brake-releasing solenoid being shown diagrammatically. Figs. 2 and 3 are vertical cross-sections taken on irregular lines 2—2 and 3—3, respectively, of Fig. 1. Fig. 4 is a cross-section taken on line 4—4 of Fig. 1. Fig. 5 is a cross-section taken on line 5—5 of Fig. 4, but drawn to a larger scale, showing the mounting of the nested disks. Figs. 6 and 7 are detail views, respectively, of the non-rotating and rotating friction disks or plates. Fig. 8 is a vertical cross-section of the oil-circulating pump, taken on line 8—8 of Fig. 9, and Fig. 9 is a longitudinal section of the pump taken on line 9—9 of Fig. 8.

Referring to the drawings, 2 designates the central portion, and 3 and 4, respectively, the opposite end portions of the frame of an electric motor.

5 is the armature shaft which has suitable bearings in the frame ends, the shaft projecting therethrough and at one end extended at 6 for transmitting power from the motor, and at its opposite end extended through end frame 3, as indicated at 7, for coöperation with the brake mechanism. Secured to extension 7 is head 8 here shown of triangular form. Projecting from end frame 3 is the annular support 9 which encircles head 8, being spaced therefrom as seen in Fig. 4. Within support 9 and encircling head 8 is a series of interleaved friction disks or plates of general ring form, the alternate disks 10 being non-rotatably held by support 9, and the intermediate disks 11 secured to head 8. The disks are arranged to slide on their respective supports in direction parallel with the axis of motor shaft 5. Thus, the non-rotating disks 10 are capable of only a sliding movement, while disks 11 are adapted to rotate as well as slide. When the disks are tightly nested, as by pressure which forces them toward the disk abutment 12 formed by end frame 3, the multiplicity of engaging surfaces provide a large area for the development of braking friction, and a powerful braking action results from relatively low square-inch surface engagement.

A slidable mounting for disks 10 is embodied in the key-like guides 13 on support 9 which are embraced by the notched ears or lugs 14 on the outer edges of disks 10. Disks 11 are formed with the similarly notched inward extensions 15 which slidably engage the key-like guides 16 on head 8.

The braking disks and their actuating mechanisms are inclosed in a dust-proof oil-confining casing or chamber 17 here shown constructed as an extension of motor end frame 3. The outer-side wall 18 of the chamber is formed with the inwardly extending circular guide 19, and slidable therein is the tubular neck portion 20 of the disk-pressing annular head 21, the latter embracing the extremity of head 8 and engaging the outermost brake disk as shown. Guide 19 is of cup form and combines with the cupped end 22 of neck 20 in confining coiled spring 23. The tendency of this spring is to expand and when unrestrained it operates to exert such pressure through head 21 on the nested disks as to set up a powerful braking action which when applied simultaneously with shutting off the current from the motor causes the latter to coast to rest uniformly for all stops, and with the amount of coast predetermined and provision made for it, overrunning is avoided, and the starting and stopping of any mechanisms dependent on or coördinated with the brake-applied mechanism are accurately timed.

In order to properly time the operations of the motor and brake so that the brake is inactive when the motor is energized and is rendered active when the motor is deënergized, an electrical device is utilized for actuating the disk pressing head 21 in opposition to spring 23, said device deriving its energy from the source which supplies current to the motor so that it is active only when the motor is energized. In the present embodiment this electrical device is in the form of a solenoid 24 which may be mounted on chamber 17, the conductors 26 for the solenoid being connected to the motor conductors 27 at the reversing switch 28, shown conventionally in Fig. 1. While a motor of three-phase type is shown, the invention is not limited thereto. The solenoid connections are such that the action of the solenoid is the same regardless of the direction of rotation of the motor.

A link 29 connects the lower end of the solenoid core with one arm of bell-crank 30, the spindle 31 of the latter being journaled in the bearing barrel 32 formed in one side of chamber 17. The other extremity 33 of bell-crank 30 engages the upper extremity of the forked lever 34, the branches of which straddle neck 20 of the disk pressure head 21, with trunnion-like pins 35 of the neck engaged by said lever branches and with the lower extremities of the latter fulcrumed on bearings 36 projecting inwardly from opposite sides of chamber 17. The forked lever may be strengthened by connecting its lower extremities as indicated at 37. A yoke 38 connects the core of the solenoid with piston 39 of the dash pot 40, the yoke embracing neck 20 of pressure head 21. The downward stroke of the solenoid core is thus cushioned, preventing injurious jarring when setting the brake.

In operation, when the motor is deënergized, the solenoid core is lowered both by gravity and by the expansive action of spring 23 transmitted through lever 34 and bell-crank 30, and the forward pressure of said spring holds head 21 pressed against the outermost friction disk and maintains the disks tightly interleaved in friction-generating engagement. As the motor and the solenoid have a common energy source, the turning off of the current deënergizes them simultaneously, and the resulting release and practically instantaneous operation of the brake serves to immediately stop the rotation of the motor shaft, the latter coasting to rest with a predetermined movement that is uniform for all stops. When current is turned into the motor, the simultaneous energizing of solenoid 24 raises the core of the latter, thereby retracting lever 34 and with it pressure head 21 notwithstanding spring 23, thereby releasing the brake.

The apparatus is preferably so constructed that when the motor is running there is a constant discharge of oil onto the upper portions of the friction brake disks, and the oil outlet 4 is arranged at such an elevation in chamber 17 as to maintain the lower portions of all the disks submerged, and this constant and thorough lubrication facilitates the dissipation of heat generated in braking and prevents the undue wearing of the disks.

Referring to the construction whereby the circulation of lubricant is maintained, outlet 41 of chamber 17 discharges into the depending reservoir 42, and the outer wall of this reservoir and wall 18 of chamber 17 are formed with the upwardly extending port 43 which is also cored horizontally through the top of chamber 17 as indicated at 44, and port 44 has its outlet 45 immediately above the brake disks. Port 43 is intersected by a pump which is operatively connected to the motor shaft, by means of which when the motor is running there is a constant upward flow of oil in said port from reservoir 42, and hence a constant discharge thereof onto the disks.

The oil circulating pump, for which no novelty *per se* is claimed herein, may be variously constructed. A pump of efficient form is illustrated in Figs. 8 and 9 and consists of a cylindrical head 46 which is secured to a shaft 48, the latter journaled in wall 18 and adapted to couple at 49 with the outer end of the motor shaft extension 7. Encircling head 46 is the sleeve-like cylinder 50 which is rotatable in the cylindrical chamber 51 in wall 18. The bore of this cylinder is eccentric to the cylinder axis, Fig. 8. The cylinder is prevented from making a complete rotation by stop 52 projecting from its outer periphery which is adapted to engage one or the other of pins 53 located at diametrically opposite sides of chamber 51. Head 46 is formed with a through piston slot or passage and slidable therein is the two-part piston 54, the opposite ends of which are held in constant engagement with the inner periphery of cylinder 50 by spring 55. When the motor is running in one direction the piston operates to force oil upwardly around one side of head 46 through space or clearance 56, Fig. 8. If the direction of rotation is reversed, cylinder 50 is simply turned through half a revolution by the reverse rotation of head 46, with stop 52 then located at the lefthand of Fig. 8 and with the oil passage or clearance extending around the righthand side of head 46. The motor thus reverses instantly with reversal of the motor shaft, and in either position of cylinder 50 its opposite ports 57 are in register with the oil port or passage 43 and the circulation of oil continues without interruption.

While the invention is here shown applied to the motor shaft, it will be understood that an electric motor and electrically controlled brake actuating means for mechanism driven by the motor may be variously arranged with a source of electrical energy common thereto whereby they are caused to operate simultaneously.

We claim:—

1. The combination of rotatable and fixed elements, friction plates movably carried respectively by said elements, plate-actuating means, an oil container, and means actuated by the rotatable element for causing oil to flow from the container onto the plates.

2. The combination of an electric motor, interleaved friction-plate braking means for the rotor thereof, said means including a disk-moving device, a spring for normally moving said device in a direction to set the brake, a lever for retracting the spring-impelled device, a solenoid having its core operatively connected to the lever, and a source of electrical energy common to the solenoid and to the motor.

3. The combination of an electric motor having an extended armature shaft, a friction disk brake applied to the shaft extension, an oil chamber inclosing the brake, the chamber having a port provided with an outlet above the disks, and oil circulating means for the port operatively connected to the motor shaft and brake actuating means.

4. The combination of an electric motor having an extended armature shaft, a friction brake device for the shaft extension, an oil chamber inclosing the brake device and having an oil circulating port adapted to discharge onto the brake device, oil circulating means actuated by the armature shaft, brake-actuating means including a solenoid, and a source of electrical energy common to the motor and to the solenoid.

5. The combination of an electric motor, a brake for the rotor thereof consisting of non-rotating friction plates encircling the rotor and other friction plates associated with the first mentioned plates and secured to the rotor, a plate-compressing device arranged concentrically with and movable longitudinally of the rotor axis, a spring normally moving said device in direction to move the several plates toward each other, a forked lever embracing said plate-compressing device and operatively connected thereto, a solenoid, a motion transmitting device interposed between the solenoid and said lever for actuating the latter to move the plate-compressing device in opposition to its spring when the solenoid is energized, and means for simultaneously energizing the motor and solenoid and for simultaneously deënergizing the same.

In testimony whereof we affix our signatures in presence of two witnesses.

HENRY A. CARPENTER.
ARTHUR W. WARNER.

Witnesses:
ADA M. STEELE,
M. J. STEELE.